(No Model.)

C. H. FULSON & J. M. DOYLE.
MARLINESPIKE.

No. 563,155. Patented June 30, 1896.

WITNESSES:
Jos. A. Ryan
M. H. Bloudel

INVENTORS
Charles H. Fulson.
James M. Doyle.
BY Munn & Co.
ATTORNEYS.

ANDREW B.GRAHAM. PHOTO-LITHO. WASHINGTON, D.C.

UNITED STATES PATENT OFFICE.

CHARLES H. FULSON AND JAMES M. DOYLE, OF VIDALIA, LOUISIANA.

MARLINESPIKE.

SPECIFICATION forming part of Letters Patent No. 563,155, dated June 30, 1896.

Application filed February 26, 1896. Serial No. 580,774. (No model.)

*To all whom it may concern:*

Be it known that we, CHARLES H. FULSON and JAMES M. DOYLE, citizens of the United States, and residents of Vidalia, in the parish of Concordia and State of Louisiana, have invented certain new and useful Improvements in Marlinespikes, of which the following specification contains a full, clear, and exact description, reference being had to the accompanying drawings, in which—

Figure 1:
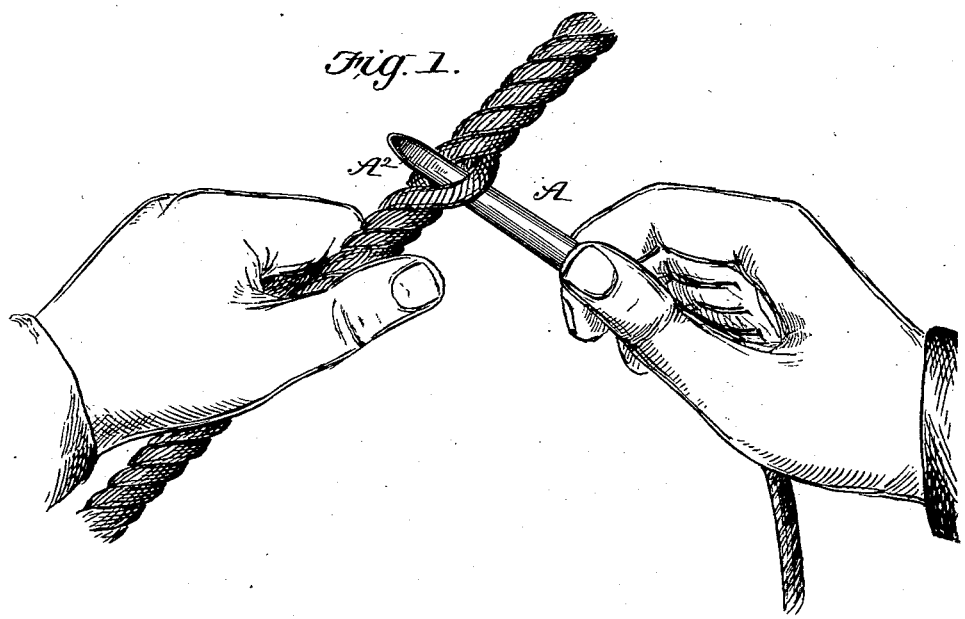
Figure 2:
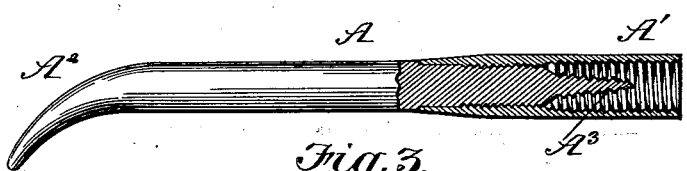
Figure 3:
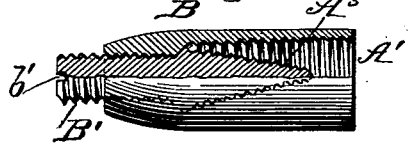
Figure 4:
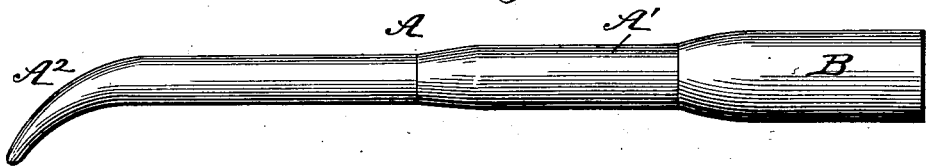

Figure 1 shows our improved marlinespike as it appears when in use. Fig. 2 is a side elevation thereof with the socket end broken away. Fig. 3 shows a similar view of an extension-piece also broken away, and Fig. 4 shows the device with the extension applied.

Our improved marlinespike is smooth and tapered exteriorly, and provided with a screw-socket for reception of and attachment to a rope end, as hereinafter described.

A represents the improved marlinespike, tapering from its socket $A'$ toward its point $A^2$, which is curved outward, and the shank of the tool screws into the same somewhat flattened. The socket $A'$ is internally threaded and is provided with a pointed tapering screw $A^3$, which projects into the socket toward the outer or open end thereof. The screw $A^3$ is of less length than the socket $A'$, so that the screw $B'$ on the forward end of an extension-socket may be screwed therein without contacting with the point of the screw $A^3$. The extension-sockets are also internally threaded and provided with the central longitudinal pointed screws $A^4$ just as in the first described socket $A'$.

The spike shown in Fig. 1 is suitable for ropes up to seven-eighths of an inch, and when the extension B is added it will be suitable for ropes over seven-eighths and under one and one-half inches. We have only shown one such extension, but as many may be used as are found necessary, and each one will be of an increased diameter. In every instance the sockets will be of somewhat greater diameter than the rope-strand which they receive, so that the strand may be readily pulled through the rope after the tool.

The end of a rope-strand will be passed into the socket, which will be screwed thereupon, and as soon as the screw $A^3$ is reached it will enter the strand and spread its fibers, which will be steadily compressed and drawn into the annular space between the screw and the inner wall of the socket. The screw thus acts to draw the rope end in, and its threads and those of the socket will absolutely prevent the spike from being pulled off. It will remain firmly on the strand until no longer needed, when it may be unscrewed and removed. Where the extension B is used, the spike will unscrew therefrom when it is to be removed, and then the socket may be unscrewed by means of any suitable bit engaging the transverse nick $b'$ in the coupling-screw $B'$.

The socket $A'$ may even firmly engage a cord or thread by first doubling or knotting the end thereof.

It will be seen that with our spike firmly attached to the strand it may be pulled thereby through a rope in even less time than the rope could be opened with an ordinary spike, and as the socket is larger than the strand the rope will not be pulled out of shape in pulling the strand through.

Owing to its shape the tool will not break or cut the fibers of the rope.

Having thus described our invention, what we claim as new, and desire to secure by Letters Patent, is—

1. A marlinespike or splicing-tool provided with an internally-threaded socket, and an internally-threaded extension-socket of greater diameter having a coupling-screw on its forward end to screw into the first-named socket, substantially as set forth.

2. A marlinespike or splicing-tool having a curved point, and internally-threaded socket, a tapering screw formed on the shank, and made of less length than the socket and extending outwardly from its base, and an internally-threaded extension-socket having a nicked screw on its forward end to screw into the first-named socket and an internal central tapering screw, substantially as set forth.

CHARLES H. FULSON.
JAMES M. DOYLE.

Witnesses:
S. L. ELAM,
J. L. DAGG.